Figure 1:
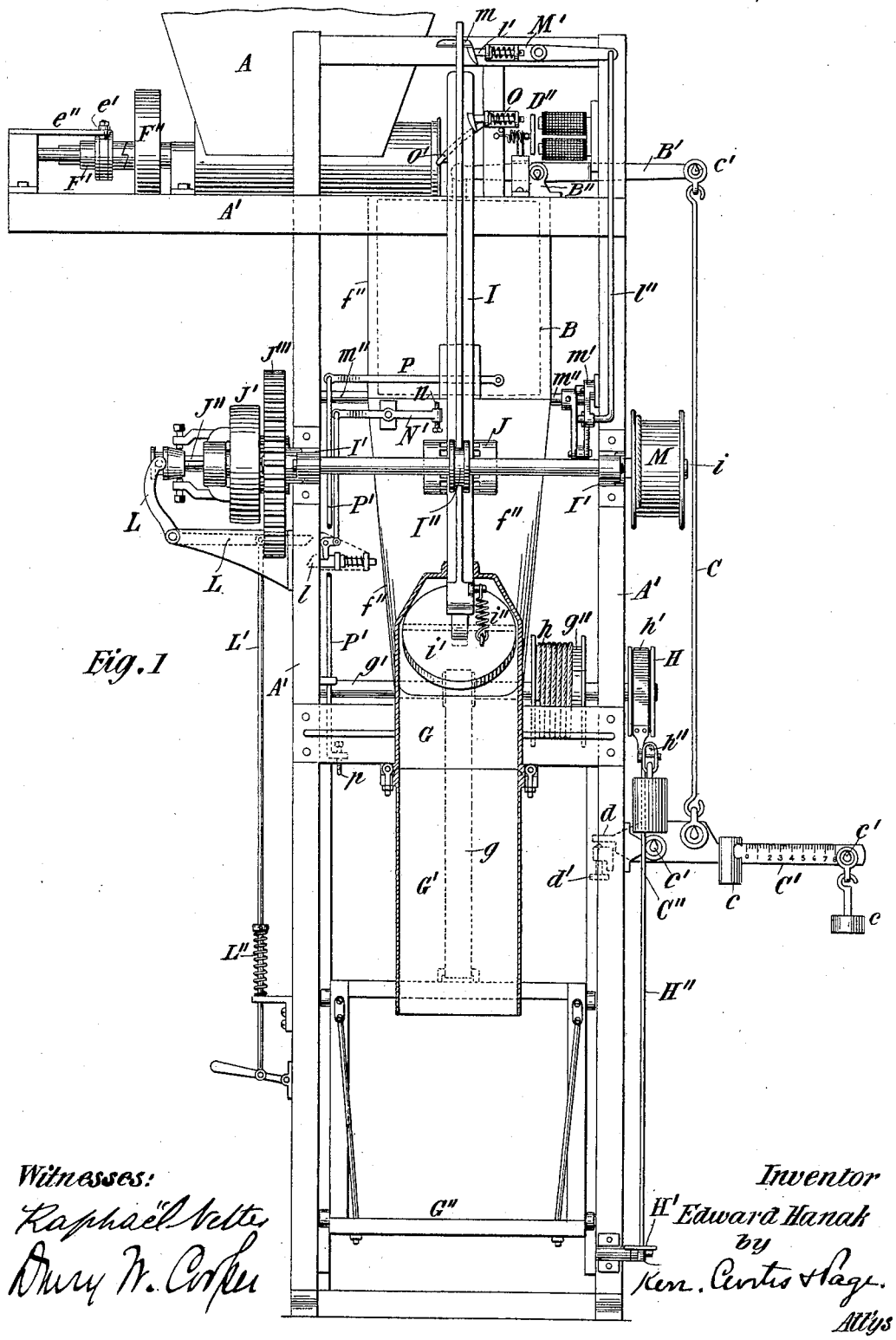

(No Model.) 4 Sheets—Sheet 3.

E. HANAK.
AUTOMATIC WEIGHING AND PACKING MACHINE.

No. 594,008. Patented Nov. 23, 1897.

Witnesses:
Raphaël Netter
Drury W. Cooper

Edward Hanak, Inventor
by Ken. Curtis & Page.
Attys.

THE NORRIS PETERS CO., PHOTO-LITHO., WASHINGTON, D. C.

(No Model.) 4 Sheets—Sheet 4.

E. HANAK.
AUTOMATIC WEIGHING AND PACKING MACHINE.

No. 594,008. Patented Nov. 23, 1897.

Witnesses:
Raphael Netter
Drury W. Cooper

Edward Hanak, Inventor
by Ken. Curtis & Page. Att'ys

UNITED STATES PATENT OFFICE.

EDWARD HANAK, OF SACRAMENTO, CALIFORNIA.

AUTOMATIC WEIGHING AND PACKING MACHINE.

SPECIFICATION forming part of Letters Patent No. 594,008, dated November 23, 1897.

Application filed March 15, 1897. Serial No. 627,489. (No model.)

*To all whom it may concern:*

Be it known that I, EDWARD HANAK, residing at Sacramento, in the county of Sacramento and State of California, have invented certain new and useful Improvements in Automatic Weighing and Packing Machines, of which the following is a specification, reference being had to the drawings accompanying and forming a part of the same.

The invention the subject of my present application for patent is an improved machine for automatically weighing grain, flour, mill products, or generally any powdered, granular, or similar substances and packing the same in predetermined quantities in suitable receptacles, such as bags, barrels, or boxes. Machines of this general character have heretofore been constructed; but the design in my present invention is to provide a practical device of fewer parts and which shall be more effective and accurate in its operation than those heretofore proposed.

My invention resides in certain novel elements or instrumentalities employed in the machine and in combinations of these and other elements which coöperate in effecting the operation, in part and in whole, of the machine. These features of novelty will be more particularly pointed out in connection with a description of their nature and purpose.

Generally speaking, the machine is constructed as follows: A hopper is provided into which the substance which is to be weighed and packed is deposited, and in connection with such hopper, whenever desirable, means are used for feeding the substance from the same to the weighing-receptacle or for sifting or otherwise treating it before delivering to such receptacle. The said material is delivered from the hopper into a receptacle, which upon the reception of a predetermined weight of material operates to close an electric circuit including or operating devices which control the supply of material, whereby the feed may be arrested as soon as the predetermined amount is weighed off.

In conjunction with the above-described devices for weighing the material there are employed instrumentalities for delivering the measured quantities of material into a receiver in which works a reciprocating plunger, by means of which the material is packed and from which it is expressed into the bag or other receptacle which is to ultimately contain it, and in combination with said plunger and the means for transmitting the impelling power thereto there are employed controlling mechanisms actuated or set in operation by predetermined movements of said plunger and which act to automatically open the weighing-receiver to release its contents, to arrest the plunger at a given point in its downward stroke, to return the same to its initial position, to close the weighing-receiver, and start in operation the feed devices which deliver material thereto.

The operation of the machine is primarily controlled by hand—that is to say, a suitable bag or package for the reception of a measured quantity of the material is placed upon a platform or stage and by the depression or operation of a hand-lever is brought up to receive the contents of the receiver or plunger chamber. The movement of a clutch-lever sets in operation the mechanism lowering the plunger at the proper time, and this movement is taken advantage of to effect the control of the other mechanism, which is thereby caused to go through its complete cycle of operation.

For a detailed description of the construction and mode of operation of the mechanisms which I have devised for carrying on the above-described operations I now refer to the accompanying drawings, in which—

Figure 2:
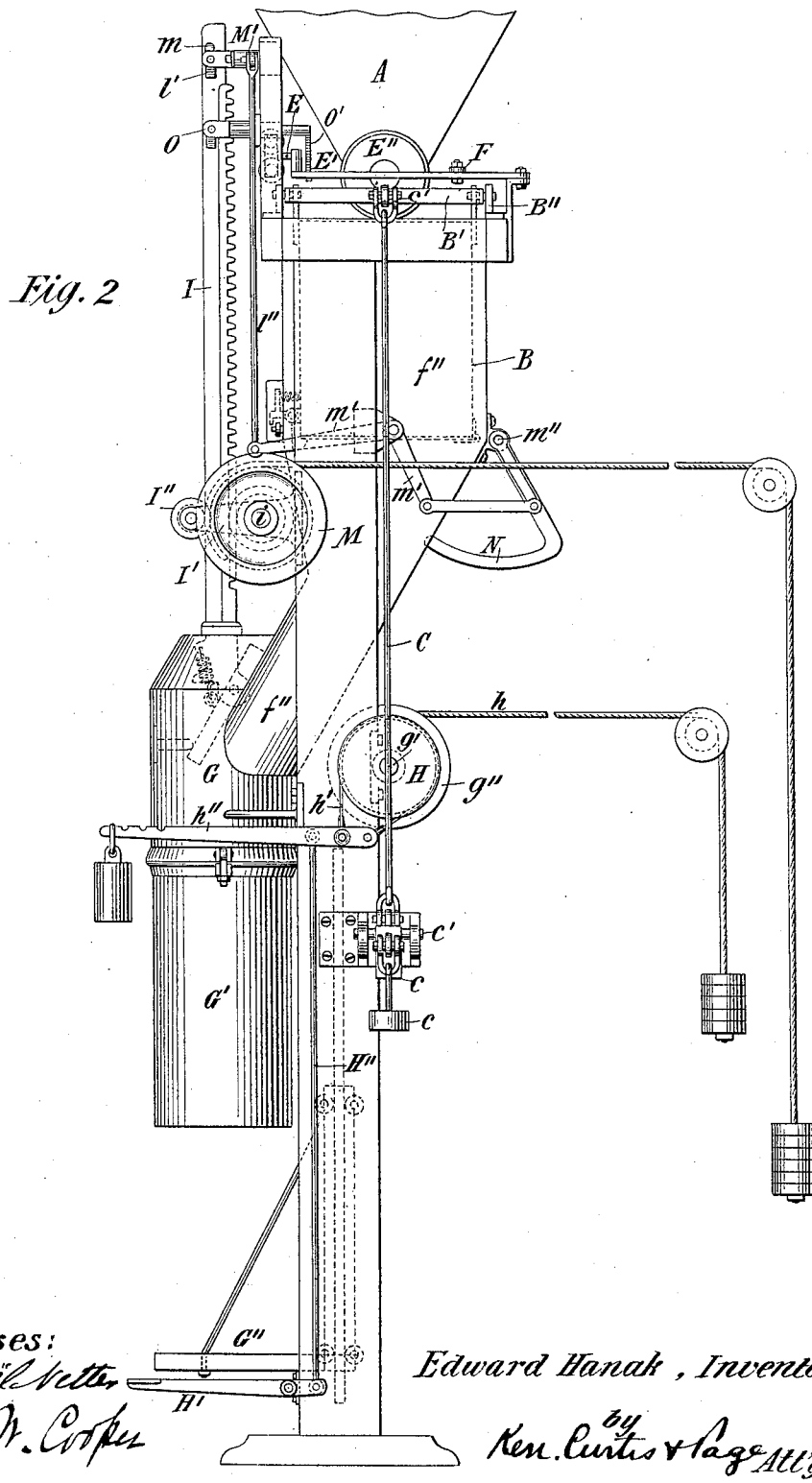
Figures 3, 4, 5:
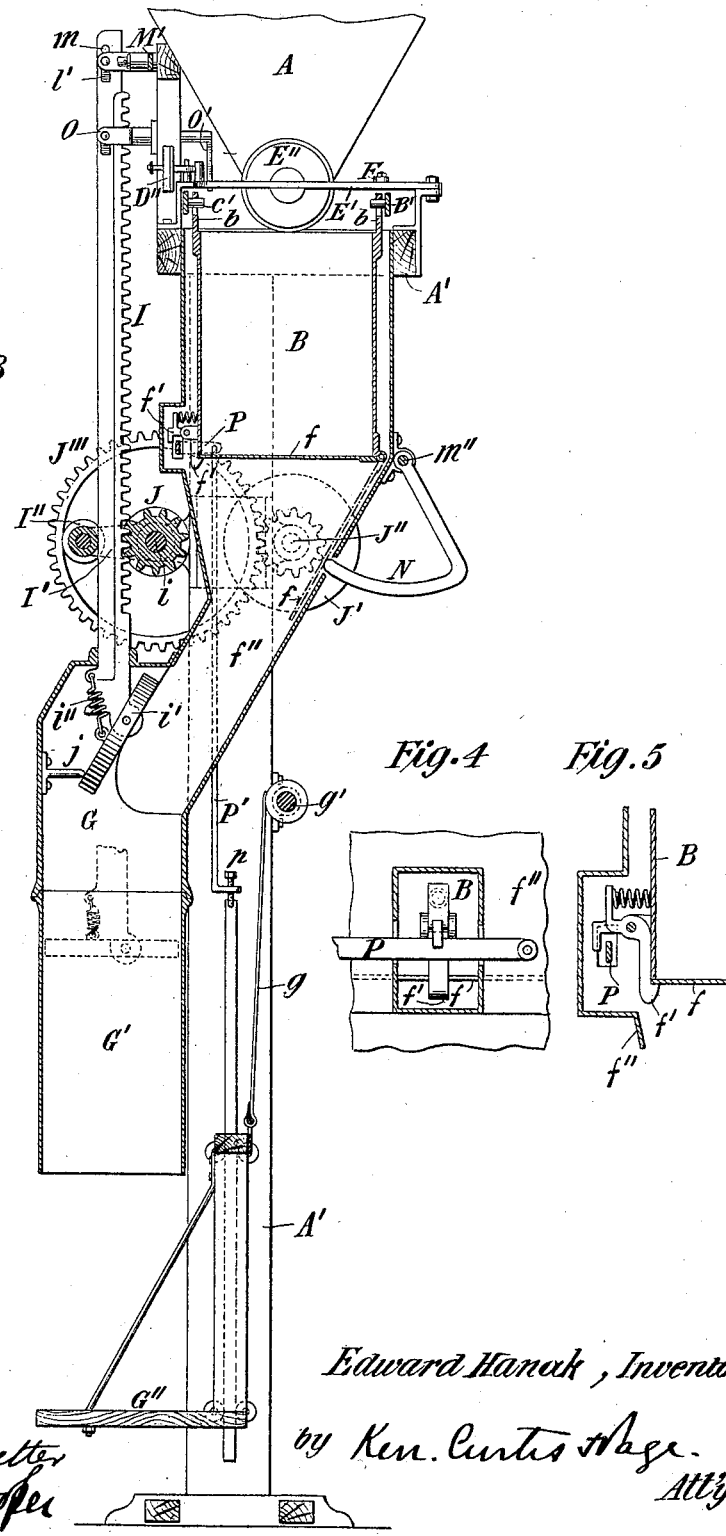
Figure 6:
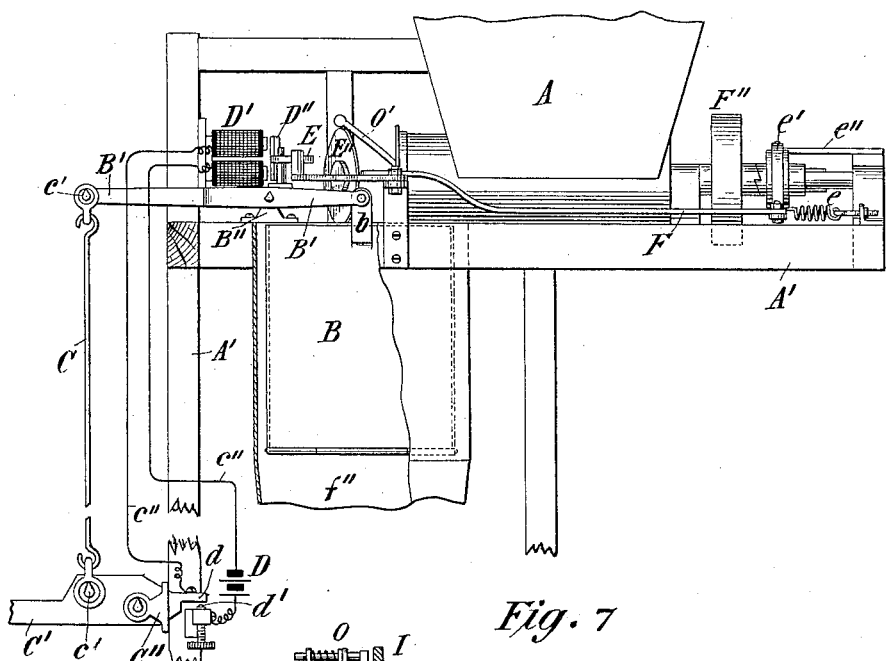
Figure 7:
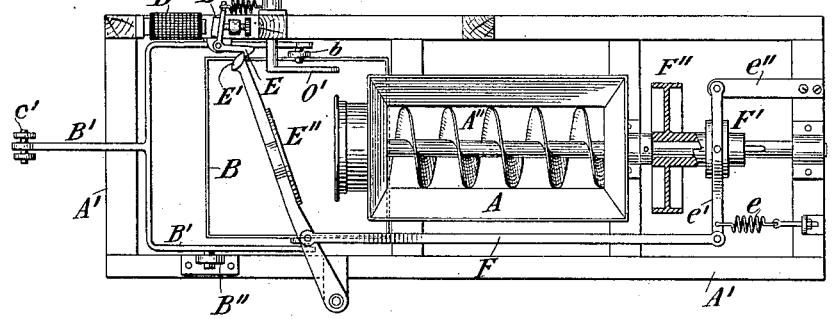
Figure 8:
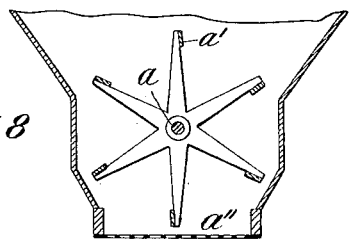

Figure 1 is a front view of the machine with certain parts in section. Fig. 2 is a side view, and Fig. 3 a vertical central section, of the same. Fig. 4 is a front and Fig. 5 a side view of the latching and releasing device for the bucket, the casing therefor being in section. Fig. 6 is a rear view, on an enlarged scale, of mechanism for opening and closing the hopper. Fig. 7 is a top plan view and part section of the same parts. Fig. 8 is a sectional view of a modified form of hopper.

A is a hopper, of suitable capacity, mounted at the top of the framework A' of the machine. For the better and more regular and certain delivery of the material from this hopper to the weighing devices I may employ a device such as a worm A", shown as arranged in a chamber below the hopper, or a contrivance designed to agitate the material or to cause it to sift through a foraminous bottom $a''$ of the hopper, such as is shown in Fig. 8, and consisting of a power-impelled shaft $a$, carrying radial arms or beaters $a'$, which rotate in the chamber at the lower portion of the hopper. The orifice of the hopper or the chamber containing the worm $A''$ lies over a bucket or receiver B and deposits the material in the same.

The bucket B is provided with ears $b$, by which it is suspended from the ends of a bifurcated lever B', with a pivotal support in a standard B'' on the frame A'. The opposite end of lever B' is connected by a rod C with a graduated scale-beam C', pivoted to a bracket C'' on the frame A' and provided with the usual weights $c$. The connections and supports between the bucket and lever B' and between this latter and the scale-beam should all be by means of knife-edge bearings $c'$, so as to eliminate as far as practicable all friction. These parts are so arranged that when the bucket B has received a weight of material predetermined by the adjustment of the weights on the scale-beam the bucket lifts the long arm of the beam. This movement of the beam is taken advantage of to control an electric circuit including or controlling devices that shut off the supply of material from the hopper. The particular means which I have devised for this purpose are as follows: The short arm of the scale-beam is formed as or is provided with a contact-point $d$, which engages with a stationary but adjustable terminal $d'$ on the frame A' when the beam is tilted by the preponderating weight of the bucket B. A circuit $c''$ between the beam or its supports and terminal $d'$ is thus completed, and in this circuit are included a battery D and an electromagnet D', the latter mounted on the frame A', as shown more clearly in Figs. 6 and 7.

The armature D'' of the magnet D' carries a latch E, and when the armature is drawn up to its magnet this latch is retracted, disengaging a lever E'. The latter carries a plate E'', which is drawn up to close the orifice of the hopper by the force of a spiral spring $e$, connected to the frame A' and to the end of a pivoted clutch-lever $e'$, pivoted to a supporting-arm $e''$ and to a connecting-rod F, which unites it to the lever E'. The clutch-lever $e'$ engages with one member of a clutch F', sliding on but turning with the shaft of the worm $A''$, the other member being on the hub of a loose pulley F'' on said shaft, so that simultaneously with the closing of the orifice of the hopper the worm $A''$ is thrown out of gear and stops rotating.

The bucket B is provided with a hinged bottom $f$, which is normally closed and retained by engagement with a latch $f'$. When this latch is released, the contents of the bucket run out into a chute $f''$ into a receptacle, in which they are packed and from which they are transferred to a packing-case.

I shall now proceed to describe the mechanism for accomplishing these last-named operations.

Mounted on the frame A' is a casing G, to which is detachably attached a cylinder G' with an open bottom. This cylinder may be of various sizes or shapes, according to the size, shape, and character of the packing bags or cases which are to receive the material to be weighed and packed. Below the cylinder G' is a platform G'', adapted to travel in guides in the sides of the frame. This platform is connected by a belt or strap $g$ with a shaft $g'$, journaled in the frame and provided with a drum $g''$, around which is wound a rope or cord $h$, that turns the drum and shaft to raise the platform. A drum H is also carried by the shaft $g'$ to receive a flexible hand-brake $h'$, one end of which is fixed, while the other connects with a weighted lever $h''$. Normally the effect of this brake is to prevent rotation of the shaft $g'$. A foot-lever H' is connected by a rod H'' with lever $h''$ and operates when depressed to ease the brake and permit the shaft $g'$ to revolve and raise the platform G''.

I is a rack which passes through a guideway formed in a bracket I', connected to the frame and comprising a grooved roller I'', mounted in the bracket and with which a tongue on the back of the rack engages, and a pinion J on a transverse shaft $i$, which meshes with the teeth of the rack. This plunger enters the top of the casing G, and its end therein is provided with a hinged piston $i'$, connected by a spiral spring $i''$ to the plunger, which tends to hold it at right angles to the plunger. A stud $j$ is set in the side of the casing G, and with this the edge of the piston $i'$ engages as the plunger rises, by which means the piston in its highest position is tilted to clear the orifice of the chute $f''$, which opens into the casing.

Power is transmitted to the plunger for lowering the same from a loose pulley J', geared by a pinion to a cog-wheel J''' on the shaft $i$. Said pulley is mounted on a countershaft J'' and is thrown in gear with the same by means of any suitable form of clutch operated by a lever L, pivoted to the frame A'. A rod L', sliding in guides on the frame and provided with a lifting-spring L'', is connected to the lever L and holds the clutch normally out of engagement with the pulley J; but a latch $l$ is attached to the frame, with which the end of lever L is caused to engage when drawn down by rod L', and power will be applied to rotate the shaft $i$ while this engagement continues. The shaft $i$ is rotated in the opposite direction and the plunger raised by a cord wound on a drum M. In the path of a projection $m$ on the plunger a lever M' projects, carrying at its engaging end a beveled spring-plunger $l'$, which permits the projection $m$ to pass by the lever on its upward travel without tilting said lever. When, however, the plunger begins to descend, it forces down the free end of the lever M' until the projection m slides off from the same, and this movement is transmitted through a connecting-rod l'' and a bell-crank lever m' to a rock-shaft m'', carrying a bent arm N, the end of which forces up the hinged bottom of the bucket B and closes and latches it. The weight of the levers and connecting-rods restores these parts to position when disengaged from the plunger. The said projection m on the plunger also encounters near the end of the downward stroke of the plunger the end of a pivoted lever N', which is provided with an adjustable screw-stop n. This lever N' is connected with the latch l, and when depressed by the plunger it shifts said latch, causing it to release the lever L. There is also a lever O, pivoted to the upper part of the frame, which is engaged by the projection m on the plunger after it has been freed from engagement with the lever M', and which lever is tilted by the downward but not by the upward travel of the plunger. This lever has a right-angled arm O', which engages with trip-lever E' and shifts the same to bring together the two members of the clutch F' when depressed by the plunger. This opens the orifice of the hopper, locks the lever E', and throws the worm into gear with its pulley.

As a means for unlocking the hinged bottom of the bucket B, I pivot to the frame a lever P, one end of which lies under one of the arms of the latch f'. The other end is connected to a vertical rod P', carrying an adjustable screw-stop p in its lower end, which lies in the path of some portion of the movable platform G'', so that when this latter rises to a given height the latch f' will be released and the contents of the bucket permitted to run down through the chute f''.

The operation and manner of using the machine will now be readily understood. Assume that the hopper contains or is receiving at a properly-adjusted rate any material, such as flour, which is to be weighed off and packed in bags and that the pulleys F'' and J are belted to suitable counter-shafting. Assume, further, that the weighing-bucket contains its predetermined charge and that the piston is in its elevated position. The attendant then places a bag or barrel on the platform G'', presses down the foot-lever H', and thus causes the platform to rise until the bag or barrel is brought up over the cylinder G'. This movement of the platform releases the latch f'' through the instrumentality of the lever P and permits the contents of the weighing-bucket to run down the chute into the cylinder G'. The attendant then draws down the rod L' until the lever L is latched and the pulley J thrown in gear with the shaft i, causing the plunger to move downward. The first operation of the plunger is to close and latch the bottom of the bucket B through the instrumentality of the lever M', as previously explained. The next is to open the hopper and start the worm in rotation to deliver the flour to the weighing-bucket. The latter will then fill until its weight tips the scale-beam, when the feed is again arrested and the charge retained until the platform is again raised and the bottom of the bucket unlatched. The piston moving down through the casing and cylinder G' packs the flour in the latter and forces it into the bag or barrel on the platform, which descends under the pressure of the plunger and against the applied friction of the brake. The plunger descends until the contents of the cylinder G' are fully expressed and packed in the barrel, at which point the projection m comes into engagement with the end of lever N', which throws the pulley J out of gear and allows the plunger to be returned by the unwinding of the cord on the drum M. The further operation is a repetition of what has been already described.

This machine has proved in practice to be a most efficient and useful device. Its operation is rapid, while always under perfect control. Its functions are performed accurately and the material subjected to the minimum amount of agitation which is possible in any method of weighing off and packing a predetermined quantity of such materials from a larger quantity in bulk.

The specific construction of the devices employed may be greatly modified without departure from the invention, and in the claims, wherein the elements or instrumentalities are not defined by reference to their specific structural characteristics, I intend to include other mechanical equivalents therefor without regard to the details of their construction or form.

I am aware that numerous machines have been constructed and proposed for weighing off and packing powdered, granular, and other substances, and I do not claim these, broadly; but What I believe to be novel and of my invention, and desire to secure by Letters Patent, is—

1. In a weighing and packing machine the combination of the following instrumentalities arranged for operation in substantially the manner described, a hopper, a weighing-bucket into which the material is delivered, a feed or delivery controlling mechanism, dependent for its operation in shutting off the feed upon the preponderating movement of the weighing-bucket, a receiver into which the contents of the bucket discharge, a plunger movable through said receiver, a movable platform for supporting and moving the receptacles for containing the material into position to receive the charges of said material from the receiver, means for discharging the contents of the bucket actuated by the platform at a predetermined point in its upward movement, and mechanism for refilling the bucket comprising means for restoring the weighing-bucket to condition to retain a charge, and means for starting the feed-delivery mechanism in operation, both of said means being actuated by the engagement therewith of the plunger at given points in its movement, as set forth.

2. In a weighing and packing machine the combination with feed-controlling devices, a weighing-bucket, and means dependent upon the preponderating movement of the weighing-bucket to arrest the feed of material to the same, of a chute through which the bucket discharges its contents into a receptacle placed to receive them, a plunger for packing the material in said receptacle, and mechanism for refilling the bucket comprising means for restoring the weighing-bucket to condition to retain a charge, and means for starting the feed-delivery mechanism in operation, both of said means being actuated by the engagement therewith of the plunger at given points in its movement, as set forth.

3. The combination in a weighing and packing machine with a feed mechanism, a weighing-bucket and means for arresting the feed, controlled by the preponderating movement of the bucket, of a receiver into which the bucket is caused to discharge, a plunger adapted to pass through the receiver, a source of power, and gearing for impelling the plunger forward, means for throwing the plunger out of gear with the power, operated by the movement of the plunger itself to a predetermined point, a device such as a drum and weighted cord for restoring the plunger to its initial position, and mechanism for refilling the bucket comprising means for restoring the weighing-bucket to condition to retain a charge, and means for starting the feed-delivery mechanism in operation, both of said means being actuated by the engagement therewith of the plunger at given points in its movement, as set forth.

4. The combination with the hopper having an orifice through which the material passes, an automatic trap or plate for closing said orifice, a locking device for holding the same open, a weighing-bucket into which the material discharges, an electromagnetic tripping device for releasing the trap, in a circuit closed by the bucket when lowered by a given weight of material, a power-impelled plunger for packing in a receptacle the contents of the bucket when discharged into such receptacle, and mechanism for reopening the trap and refilling the bucket actuated by the plunger at a given point in its travel, as set forth.

5. In a weighing and packing machine, the combination with an automatic weighing-bucket, having a hinged bottom, and a spring-latch for holding the same closed, of a power-impelled plunger for packing the contents of the bucket when discharged into a receptacle, means for tripping the latch and emptying the bucket of its contents, and a system of levers shifted by the plunger at a given point in its movement and operating to close and latch the bottom of the bucket, as set forth.

In testimony whereof I have hereunto set my hand this 8th day of March, 1897.

EDWARD HANAK.

Witnesses:
O. G. SAGE,
J. B. WRIGHT.